(12) United States Patent
Luo et al.

(10) Patent No.: US 11,089,498 B2
(45) Date of Patent: Aug. 10, 2021

(54) MEASUREMENT PARAMETER SENDING METHOD AND APPARATUS

(71) Applicant: Huawei Technologies Co., Ltd., Shenzhen (CN)

(72) Inventors: Jun Luo, Kista (SE); Jin Liu, Shenzhen (CN); Zhengzheng Xiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 16/586,783

(22) Filed: Sep. 27, 2019

(65) Prior Publication Data
US 2020/0068421 A1    Feb. 27, 2020

Related U.S. Application Data

(63) Continuation of application No. PCT/CN2018/080965, filed on Mar. 28, 2018.

(30) Foreign Application Priority Data

Mar. 29, 2017  (CN) .......................... 201710198778.1
May 5, 2017    (CN) .......................... 201710314218.8

(51) Int. Cl.
*H04W 24/10* (2009.01)
*H04W 72/04* (2009.01)
(Continued)

(52) U.S. Cl.
CPC .......... *H04W 24/10* (2013.01); *H04L 1/0026* (2013.01); *H04L 5/0051* (2013.01); *H04W 16/28* (2013.01);
(Continued)

(58) Field of Classification Search
CPC ... H04W 24/10; H04W 72/046; H04W 16/18; H04W 56/001; H04L 5/0051; H04L 1/0026
See application file for complete search history.

(56) References Cited

U.S. PATENT DOCUMENTS 8,577,386 B2 * 11/2013 Gao ...................... H04W 24/10
                                                                    455/453
10,187,188 B2 * 1/2019 Jung ................... H04W 56/001
(Continued)

FOREIGN PATENT DOCUMENTS

CN        101291517 A    10/2008
CN        102438304 A     5/2012
(Continued)

OTHER PUBLICATIONS

"Beam Related Measurement Report and Inter-cell HO in NR," 3GPP TSG-RAN WG2 Meeting #97, Athens, Greece, R2-1701921 (Revision of R2-1700532), pp. 1-7, 3rd Generation Partnership, Project, Valbonne, France (Feb. 13-17, 2017).
(Continued)

*Primary Examiner* — Rasheed Gidado
(74) *Attorney, Agent, or Firm* — Leydig, Voit & Mayer, Ltd.

(57) ABSTRACT

A measurement parameter sending method and apparatus are described. The method includes receiving measurement signals corresponding to a plurality of beams. The received measurement signals corresponding to the plurality of beams are measured to obtain a beam measurement parameter. A cell-level measurement parameter is generated based on the beam measurement parameter. The cell-level measurement parameter is reported to a network device. Correspondingly, a measurement parameter receiving method and apparatus are disclosed. Measurement reporting of a plurality of beams
(Continued)

can be implemented in a new radio NR system, thereby reducing reporting overheads.

20 Claims, 6 Drawing Sheets

(51) Int. Cl.
*H04W 56/00* (2009.01)
*H04W 16/28* (2009.01)
*H04L 1/00* (2006.01)
*H04L 5/00* (2006.01)

(52) U.S. Cl.
CPC ....... *H04W 56/001* (2013.01); *H04W 72/046* (2013.01)

(56) References Cited

U.S. PATENT DOCUMENTS

| | | | | |
|---|---|---|---|---|
| 10,652,790 | B2* | 5/2020 | Lu | H04W 24/10 |
| 10,728,810 | B2* | 7/2020 | Harada | H04W 16/28 |
| 10,742,346 | B2* | 8/2020 | Zhou | H04J 11/0073 |
| 2005/0176468 | A1* | 8/2005 | Iacono | H04B 7/0871 |
| | | | | 455/562.1 |
| 2016/0190707 | A1* | 6/2016 | Park | H01Q 3/24 |
| | | | | 370/334 |
| 2016/0309376 | A1* | 10/2016 | Liu | H04L 5/0048 |
| 2017/0208494 | A1* | 7/2017 | Moon | H04L 5/0048 |
| 2017/0289917 | A1* | 10/2017 | Visotsky | H04W 52/143 |
| 2019/0313308 | A1* | 10/2019 | Li | H04W 36/08 |

FOREIGN PATENT DOCUMENTS

| | | |
|---|---|---|
| CN | 102684850 A | 9/2012 |
| CN | 103546398 A | 1/2014 |
| CN | 104869649 A | 8/2015 |
| CN | 105340345 A | 2/2016 |
| CN | 105493595 A | 4/2016 |
| EP | 2380375 B1 | 12/2013 |
| WO | 2012116584 A1 | 9/2012 |
| WO | 2012124552 A1 | 9/2012 |
| WO | 2016085266 A1 | 6/2016 |

OTHER PUBLICATIONS

"How to derive a cell quality for RRM measurement," 3GPP TSG-RAN WG2 Meeting #97, Athens, Greece, R2-1701908 (Revision of R2-1700312), pp. 1-4, 3rd Generation Partnership, Project, Valbonne, France (Feb. 13-17, 2017).

"Discussion on Beam Measurement and Tracking for 5G New Radio Interface in mmWave Frequency Bands," 3GPP TSG RAN WG2 #93bis, Dubrovnik, Croatia, R2-162226, pp. 1-5, 3rd Generation Partnership, Project, Valbonne, France (Apr. 11-15, 2016).

* cited by examiner

MEASUREMENT PARAMETER SENDING METHOD AND APPARATUS

CROSS-REFERENCE TO RELATED APPLICATIONS

This application is a continuation of International Application No. PCT/CN2018/080965, filed on Mar. 28, 2018, which claims priority to Chinese Patent Application No. 201710198778.1, filed on Mar. 29, 2017 and Chinese Patent Application No. 201710314218.8, filed on May 5, 2017. The disclosures of the aforementioned applications are hereby incorporated by reference in their entireties.

TECHNICAL FIELD

The present invention relates to the communications field, and in particular, to a measurement parameter sending method and apparatus.

BACKGROUND

Radio resource management (RRM) is to provide service quality assurance for a wireless user terminal in a network under the condition of a limited bandwidth. A basic goal of the radio resource management is to flexibly allocate and dynamically adjust, when network traffic distribution is uneven and a channel feature fluctuates due to channel fading and interference, resources available for a wireless transmission part and a network, so as to maximize radio spectrum utilization, and prevent network congestion and maintain signaling load as low as possible. The RRM includes power control, channel allocation, scheduling, handover, access control, load control, adaptive coding and modulation, and the like.

Currently, in a long term evolution (LTE) system, a measurement manner based on a downlink reference signal is used for cell handover in the RRM, to be specific, when a base station sends a reference signal (RS) to user equipment (UE) in a coverage area of the base station, a cell specific reference signal (CRS) of a fixed time-frequency resource is usually sent. When UE receives the CRS sent by the base station, the UE performs measurement based on the CRS, and reports a measurement result to the base station. When receiving the measurement result fed back by the UE, the base station determines, based on the measurement result, whether the UE needs to perform cell handover.

In the LTE system, the UE performs measurement reporting based on the CRS without considering a case in which the base station sends a plurality of transmit beams. However, in a new radio (NR) system, the base station may send a plurality of transmit beams, and if the UE still performs measurement reporting by using the CRS, measurement reporting needs to be performed for each transmit beam. This increases reporting overheads.

SUMMARY

A technical problem to be resolved in embodiments of the present invention is to provide a measurement parameter sending method and apparatus, to implement measurement reporting of a plurality of beams in an NR system, thereby reducing reporting overheads.

According to a first aspect, an embodiment of the present invention provides a measurement parameter sending method, including: receiving measurement signals corresponding to a plurality of beams; measuring the received measurement signals corresponding to the plurality of beams to obtain a beam measurement parameter; generating a cell-level measurement parameter based on the beam measurement parameter; and reporting the cell-level measurement parameter to a network device.

According to a second aspect, an embodiment of the present invention provides a measurement parameter sending apparatus, including: a receiving unit, configured to receive measurement signals corresponding to a plurality of beams; a measurement unit, configured to measure the received measurement signals corresponding to the plurality of beams to obtain a beam measurement parameter; a generation unit, configured to generate a cell-level measurement parameter based on the beam measurement parameter; and a sending unit, configured to report the cell-level measurement parameter to a network device.

According to a third aspect, an embodiment of the present invention provides user equipment, including a processor and a transceiver, where the transceiver is configured to receive measurement signals corresponding to a plurality of beams; the processor is configured to measure the measurement signals that are received by the transceiver and that correspond to the plurality of beams to obtain a beam measurement parameter; the processor is further configured to generate a cell-level measurement parameter based on the beam measurement parameter; and the transceiver is configured to report the cell-level measurement parameter to a network device.

In the foregoing three aspects, the user equipment measures the measurement signals corresponding to the plurality of beams, and sends the cell-level measurement parameter, to implement measurement reporting of the plurality of beams in the NR system, thereby reducing reporting overheads.

With reference to the foregoing three aspects, in a possible implementation, the measurement signals include synchronization signals, and the measuring the received measurement signals corresponding to the plurality of beams to obtain a beam measurement parameter is specifically measuring the received synchronization signals corresponding to the plurality of beams to obtain the beam measurement parameter.

With reference to the foregoing three aspects, in a possible implementation, the measurement signals include synchronization signals and demodulation reference signals, and the measuring the received measurement signals corresponding to the plurality of beams to obtain a beam measurement parameter is specifically measuring the received synchronization signals and demodulation reference signals corresponding to the plurality of beams to obtain the beam measurement parameter.

With reference to the foregoing three aspects, in a possible implementation, the beam measurement parameter includes a plurality of beam measurement parameters corresponding to the plurality of beams; and a specific process of generating the cell-level measurement parameter based on the beam measurement parameter is: averaging the plurality of beam measurement parameters corresponding to the plurality of beams to obtain a first average measurement parameter, and determining the first average measurement parameter as the cell-level measurement parameter; averaging first N beam measurement parameters of the plurality of beam measurement parameters that correspond to the plurality of beams and that are sorted in descending order, to obtain a second average measurement parameter, and determining the second average measurement parameter as the cell-level measurement parameter, where N is a positive integer;

averaging beam measurement parameters that exceeds a preset threshold in the plurality of beam measurement parameters corresponding to the plurality of beams to obtain a third average measurement parameter, and determining the third average measurement parameter as the cell-level measurement parameter; or obtaining a largest beam measurement parameter of the plurality of beam measurement parameters corresponding to the plurality of beams, and determining the largest beam measurement parameter as the cell-level measurement parameter. In this possible implementation, there is one cell-level measurement parameter.

With reference to the foregoing three aspects, in a possible implementation, the cell-level measurement parameter includes a plurality of beam measurement parameters corresponding to the plurality of beams; the cell-level measurement parameter includes first M beam measurement parameters of the plurality of beam measurement parameters that correspond to the plurality of beams and that are sorted in descending order, where M is a positive integer; or the cell-level measurement parameter is a largest beam measurement parameter of the plurality of beam measurement parameters corresponding to the plurality of beams. In this possible implementation, there are one, M, or a plurality of cell-level measurement parameters.

With reference to the foregoing three aspects, in a possible implementation, a specific process of measuring the received measurement signals corresponding to the plurality of beams to obtain a beam measurement parameter is: measuring the received measurement signals corresponding to the plurality of beams to obtain a plurality of beam measurement parameters corresponding to the plurality of beams; and averaging the plurality of beam measurement parameters corresponding to the plurality of beams to obtain a first average measurement parameter, and determining the first average measurement parameter as the beam measurement parameter. In this case, the beam measurement parameter is determined as the cell-level measurement parameter, that is, the first average measurement parameter is determined as the cell-level measurement parameter.

With reference to the foregoing three aspects, in a possible implementation, a specific process of measuring the received measurement signals corresponding to the plurality of beams to obtain a beam measurement parameter is: measuring the received measurement signals corresponding to the plurality of beams to obtain a plurality of beam measurement parameters corresponding to the plurality of beams; and averaging P beam measurement parameters corresponding to first P beams of the plurality of beams sorted in time order, to obtain a second average measurement parameter, and determining the second average measurement parameter as the beam measurement parameter, where P is a positive integer. In this case, the beam measurement parameter is determined as the cell-level measurement parameter, that is, the second average measurement parameter is determined as the cell-level measurement parameter.

With reference to the foregoing three aspects, in a possible implementation, a specific process of measuring the received measurement signals corresponding to the plurality of beams to obtain a beam measurement parameter is: measuring the received measurement signals corresponding to the plurality of beams to obtain a plurality of beam measurement parameters corresponding to the plurality of beams; and averaging Q beam measurement parameters corresponding to Q beams that are of the plurality of beams and that are at a preset time location to obtain a third average measurement parameter, and determining the third average measurement parameter as the beam measurement parameter, where Q is a positive integer. In this case, the beam measurement parameter is determined as the cell-level measurement parameter, that is, the third average measurement parameter is determined as the cell-level measurement parameter.

With reference to the foregoing three aspects, in a possible implementation, if configuration information of a channel state information reference signal CSI-RS is received, all ports of the CSI-RS are measured based on the configuration information to obtain a CSI-RS cell-level measurement parameter, where the CSI-RS cell-level measurement parameter is an average measurement parameter obtained by averaging all CSI-RS measurement parameters corresponding to all the ports; is an average measurement parameter obtained by averaging first L CSI-RS measurement parameters of all CSI-RS measurement parameters that correspond to all the ports and that are sorted in descending order, where L is a positive integer; or is a largest CSI-RS measurement parameter of all CSI-RS measurement parameters corresponding to all the ports.

With reference to the foregoing three aspects, in a possible implementation, the beam measurement parameter and the CSI-RS cell-level measurement parameter are averaged to obtain the cell-level measurement parameter.

According to a fourth aspect, an embodiment of the present invention provides a measurement parameter receiving method, including: sending measurement signals corresponding to a plurality of beams; and receiving a cell-level measurement parameter, where the cell-level measurement parameter is generated based on a beam measurement parameter, and the beam measurement parameter is obtained by measuring the measurement signals corresponding to the plurality of beams.

According to a fifth aspect, an embodiment of the present invention provides a measurement parameter receiving apparatus, including: a sending unit, configured to send measurement signals corresponding to a plurality of beams; and a receiving unit, configured to receive a cell-level measurement parameter, where the cell-level measurement parameter is generated based on a beam measurement parameter, and the beam measurement parameter is obtained by measuring the measurement signals corresponding to the plurality of beams.

According to a sixth aspect, an embodiment of the present invention provides a network device, including a processor and a transceiver, where the transceiver is configured to send measurement signals corresponding to a plurality of beams; and the transceiver is configured to receive a cell-level measurement parameter, where the cell-level measurement parameter is generated based on a beam measurement parameter, and the beam measurement parameter is obtained by measuring the measurement signals corresponding to the plurality of beams.

In the foregoing fourth aspect to the foregoing sixth aspect, the network device receives the cell-level measurement parameter, to perform inter-cell handover or reselection based on the cell-level measurement parameter.

According to a seventh aspect, this application provides a computer readable storage medium, including an instruction, where a computer is enabled to perform the measurement parameter sending method according to the first aspect when the computer readable storage medium runs on the computer.

According to an eighth aspect, this application provides a computer readable storage medium, including an instruction, where a computer is enabled to perform the measurement parameter receiving method according to the fourth aspect when the computer readable storage medium runs on the computer.

According to the embodiments of the present invention, user equipment can implement measurement reporting of a plurality of beams in the NR system, thereby reducing reporting overheads.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes embodiments of the present invention with reference to the accompanying drawings in the embodiments of the present invention.

Figure 1A:
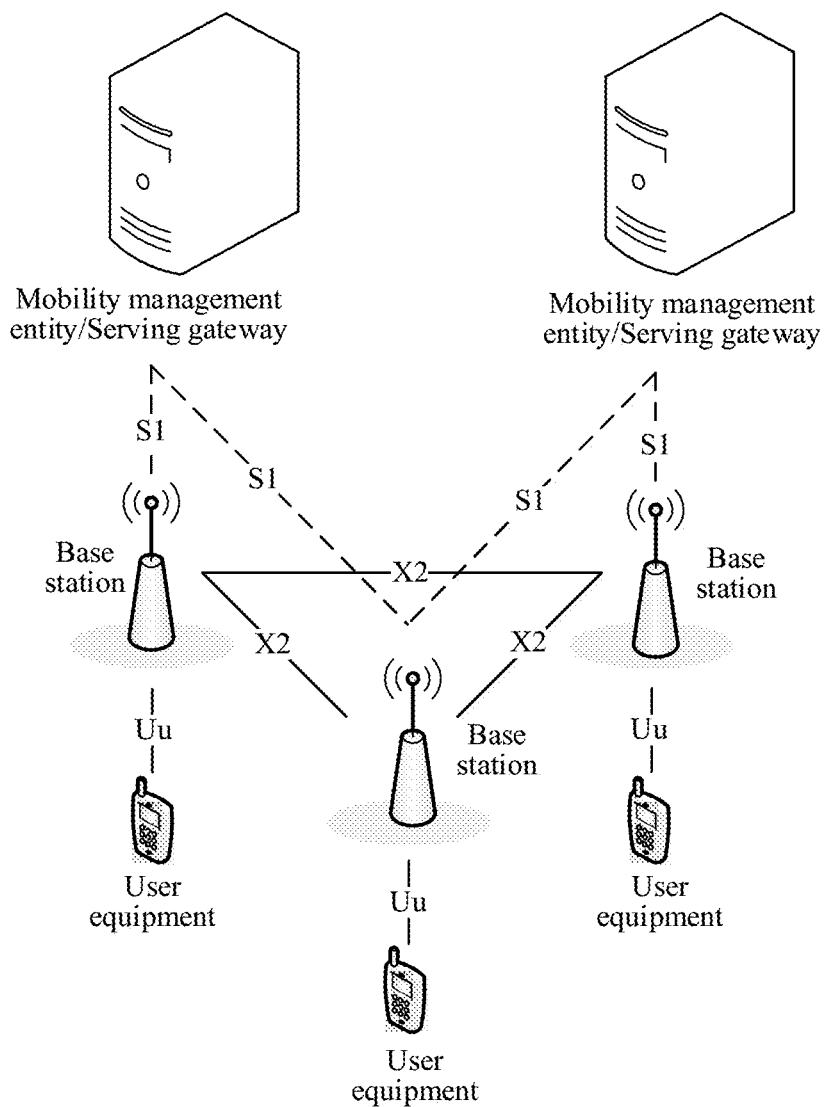
FIG. 1a is an example of a schematic diagram of a network architecture to which an embodiment of the present invention is applicable.

FIG. 1a is an example of a schematic diagram of a network architecture to which an embodiment of the present invention is applicable. The network architecture may be a network architecture of an LTE communications system, a universal mobile telecommunications system (UMTS) terrestrial radio access network (UMTS Terrestrial Radio Access Network, UTRAN) architecture, or a global system for mobile communications (GSM)/enhanced data rate for GSM evolution (EDGE) radio access network (GSM/EDGE Radio Access Network, GERAN) architecture, or even may be a 5th-generation (5G) mobile communications system architecture. The network architecture includes mobility management entities (MME)/serving gateways (SGW), base stations, and user equipments (UE). It should be noted that forms and quantities of the MMEs/SGWs, the base stations, and the UEs shown in FIG. 1a are used as an example of description, and do not constitute any limitation on the embodiments of the present invention.

The MME is a key control node in 3rd generation partnership project (3GPP) LTE, belongs to network elements of a core network, and is mainly responsible for a signaling processing part, that is, a control plane function, including functions such as access control, mobility management, attach and detach, session management, and gateway selection. The SGW is an important network element of the network elements of the core network in 3GPP LTE, and is mainly responsible for a user plane function of user data forwarding, that is, routing and forwarding of a data packet under control of the MME.

A base station is configured to communicate with user equipment, and may be a base transceiver station (BTS) in a GSM system or a code division multiple access (CDMA) system, may be a NodeB (NB) in a WCDMA system, may be an evolved NodeB (eNB) in an LTE system, or even may be a base station in a 5G system or a base station in a future communications system. The base station is mainly responsible for functions such as radio resource management, quality of service (QoS) management, data compression, and encryption on an air interface side. For a core network side, the base station is mainly responsible for forwarding control plane signaling to the MME and forwarding user plane service data to the SGW.

The user equipment is a device accessing the network side through the base station, and may include but is not limited to a cellular phone, a cordless telephone set, a session initiation protocol (SIP) phone, a wireless local loop (WLL) station, a personal digital assistant (PDA), a handheld device with a wireless communication function, a computing device, or another processing device connected to a wireless modem, an in-vehicle device, a wearable device, a terminal device in a future 5G network, and the like.

An S1 interface shown in FIG. 1a is a standard interface between a base station and a core network. The base station is connected to the MME through an S1-MME interface, and is used for transmission of control signaling. The base station is connected to the SGW through an S1-U interface, and is used for transmission of user data. The S1-MME interface and the S1-U interface are collectively referred to as the S1 interface.

An X2 interface shown in FIG. 1a is a standard interface between base stations, and is configured to implement interworking between the base stations.

A Uu interface shown in FIG. 1a is a standard interface between user equipment and a base station, and the user equipment accesses an LTE/5G network through the Uu interface.

Figure 1B:
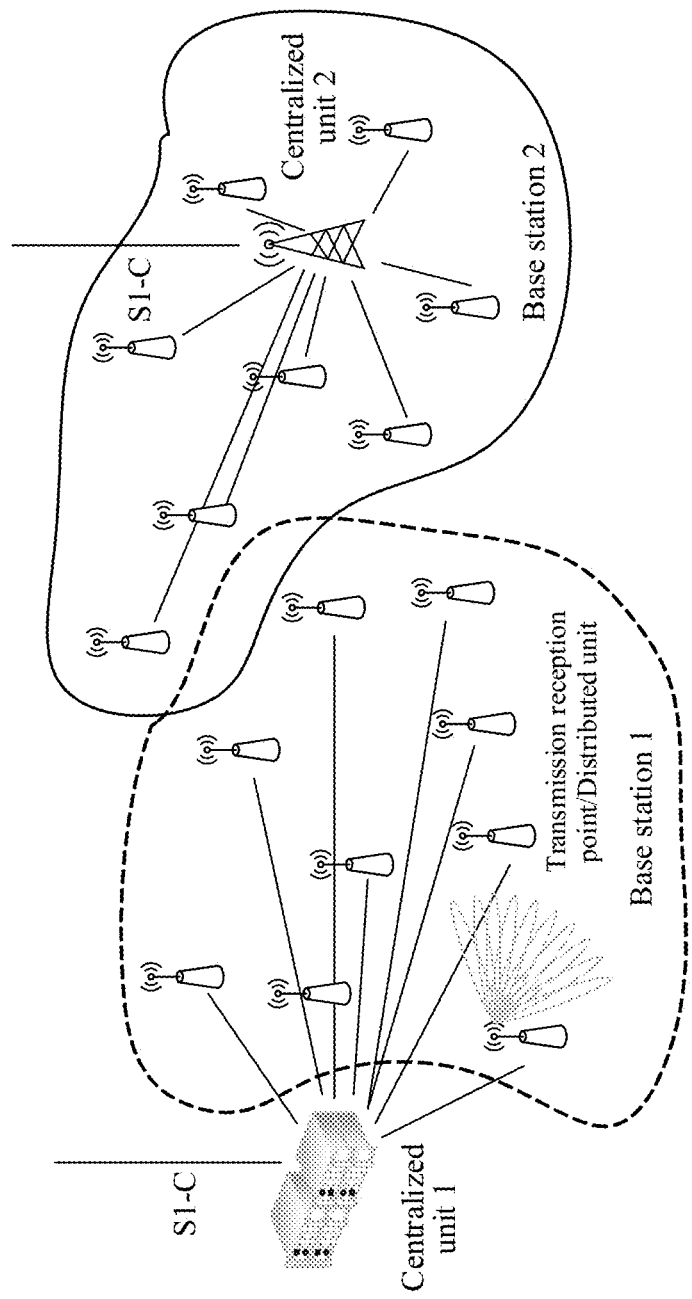
FIG. 1b is an example of a schematic diagram of another network architecture to which an embodiment of the present invention is applicable.

FIG. 1b is an example of a schematic diagram of another network architecture to which an embodiment of the present invention is applicable. The schematic diagram of the network architecture may be a diagram of a network architecture of new radio (NR) in a next generation wireless communications system. In the schematic diagram of the network architecture, one base station is divided into one centralized unit (CU) and a plurality of transmission reception points (TRP)/distributed units (DU), that is, a bandwidth-based unit (BBU) of the base station is reconstructed into functional entities: a DU and a CU. It should be noted that forms and quantities of centralized units and TRPs/DUs shown in FIG. 1b are as an example of description, and do not constitute any limitation on the embodiments of the present invention. Although forms of respective centralized units corresponding to a base station 1 and a base station 2 shown in FIG. 1b are different, respective functions are not affected. It may be understood that a centralized unit 1 and a TRP/DU in a dotted line range are elements constituting the base station 1, a centralized unit 2 and a TRP/DU in a solid line range are elements constituting the base station 2, and the base station 1 and the base station 2 are base stations used in an NR system.

The CU processes a wireless high-layer protocol stack function, such as a radio resource control (RRC) layer or a packet data convergence protocol (PDCP) layer, and even can support some core network functions in sinking to an access network. The access network is termed as an edge computing network, and can meet higher network delay requirements of a future communications network for emerging services such as video, online shopping, and virtual/augmented reality.

The DU mainly processes a physical layer function and a layer 2 function with a higher real-time requirement. Considering a transmission resource of a radio remote unit (RRU) and a transmission resource of the DU, some physical layer functions of the DU may be moved up to the RRU, and with miniaturization of the RRU, even more radically, the DU may be combined with the RRU.

The CU may be deployed in a centralized manner. DU deployment depends on an actual network environment. In a core urban area with relatively high traffic density and relatively small station spacing, in a region with limited computer room resources, such as a university or a large-scale performance venue, the DU may also be deployed in a centralized manner. In an area with relatively sparse traffic and relatively large station spacing, such as a suburban county or a mountainous area, the DU may be deployed in a distributed manner.

An S1-C interface shown in FIG. 1b is a standard interface between a base station and a core network, and specific devices to which the S1-C interface connects are not shown in FIG. 1b.

Based on the schematic diagram of the network architecture shown in FIG. 1a or FIG. 1b, the currently used downlink-signal-based measurement manner is: the base station or the TRP sends a CRS to UE in a coverage area of the base station or the TRP; when receiving the CRS, the UE performs measurement based on the CRS, and reports a measurement result to the base station or the TRP; and when receiving the measurement result fed back by the UE, the base station or the TRP determines, based on the measurement result, whether the UE needs to perform cell handover. In an LTE system, the UE performs measurement reporting based on the CRS without considering a case in which the base station sends a plurality of transmit beams. However, in a new radio (NR) system, the base station may send a plurality of transmit beams, and if the UE still performs measurement reporting by using the CRS, measurement reporting needs to be performed for each transmit beam. This increases reporting overheads.

In view of this, the embodiments of the present invention provide a measurement parameter sending method and apparatus, to implement measurement reporting of a plurality of beams in the NR system, thereby reducing reporting overheads. In particular, reporting overheads of layer 3 signaling can be reduced. Correspondingly, the embodiments of the present invention further provide a measurement parameter receiving method and apparatus.

The measurement parameter sending method and apparatus and the measurement parameter receiving method and apparatus provided in the embodiments of the present invention may be applied to the schematic diagram of the network architecture shown in FIG. 1a or FIG. 1b. A network device in the embodiments of the present invention may be the base station shown in FIG. 1a, may be the TRP/DU shown in FIG. 1b, or may be a combination of the TRP/DU and the CU. The user equipment in the embodiments of the present invention may include but is not limited to a cellular phone, a cordless telephone set, a handheld device with a wireless communication function, a computing device, or another processing device connected to a wireless modem, an in-vehicle device, a wearable device, a terminal device in a future 5G network, and the like. In addition, although the embodiments of the present invention include a plurality of network elements, it does not mean that the solutions protected by this application need to include all network elements.

Figure 2:
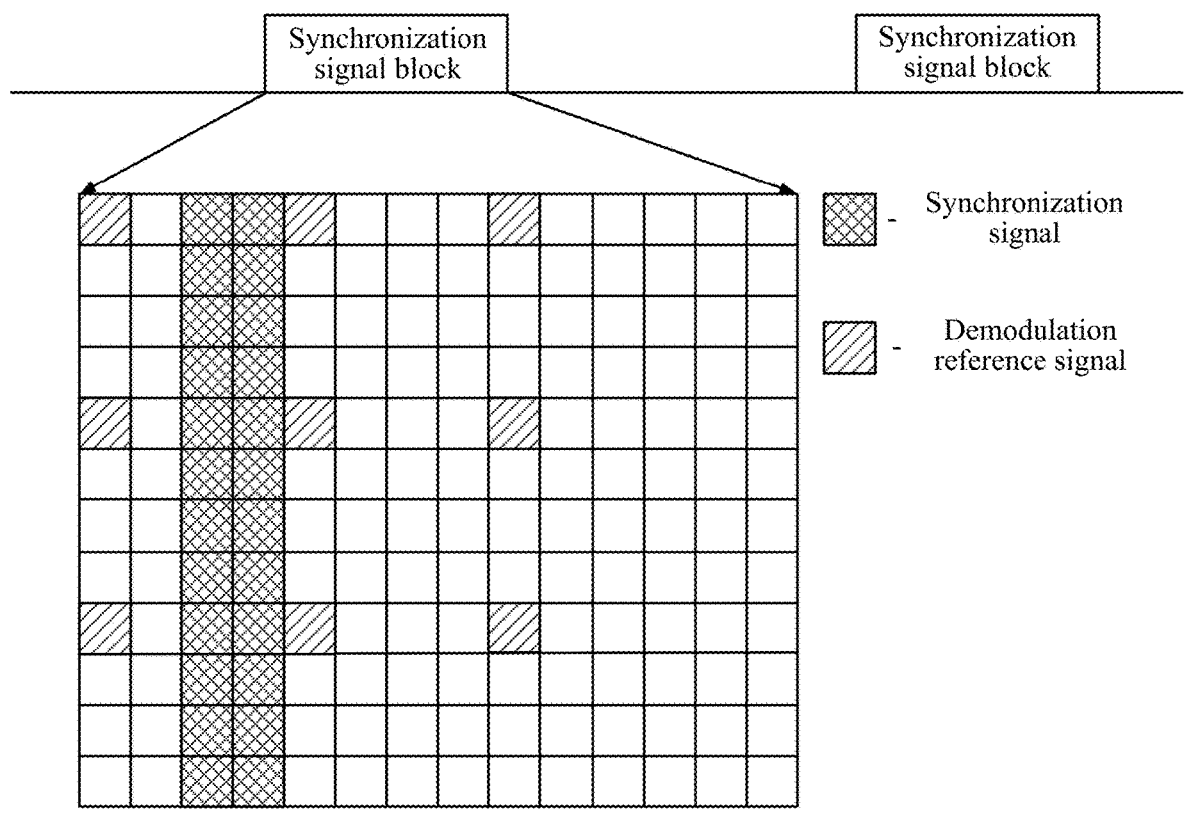
FIG. 2 is a schematic diagram of a configuration of a time-frequency resource of a synchronization signal block.

A synchronization signal block (SS block) is briefly described below. FIG. 2 is a schematic diagram of a configuration of a time-frequency resource of an SS block. It can be learned from FIG. 2 that, a structure of the time-frequency resource of the SS block is the same as a structure of a time-frequency resource in an LTE system, and has 14 symbols in a time dimension, representing one frame, and has 12 subcarriers in a frequency dimension. A resource element (RE) on which cross lines shown in FIG. 2 are located indicates a time-frequency resource occupied by an SS, and an RE on which oblique lines shown in FIG. 2 are located indicates a time-frequency resource occupied by a demodulation reference signal (DM-RS). The DM-RS is used for related demodulation of a physical broadcast channel (PBCH), and is configured by a network device. It may be understood that one SS block corresponds to one beam of the network device, and measuring the beam is actually measuring a measurement signal in the SS block corresponding to the beam. It may also be understood that a plurality of SS blocks correspond to one beam of the network device, and measuring the beam is actually measuring measurement signals in the plurality of SS blocks corresponding to the beam.

The measurement parameter sending method provided in the embodiments of the present invention is described in detail below.

Figure 3:
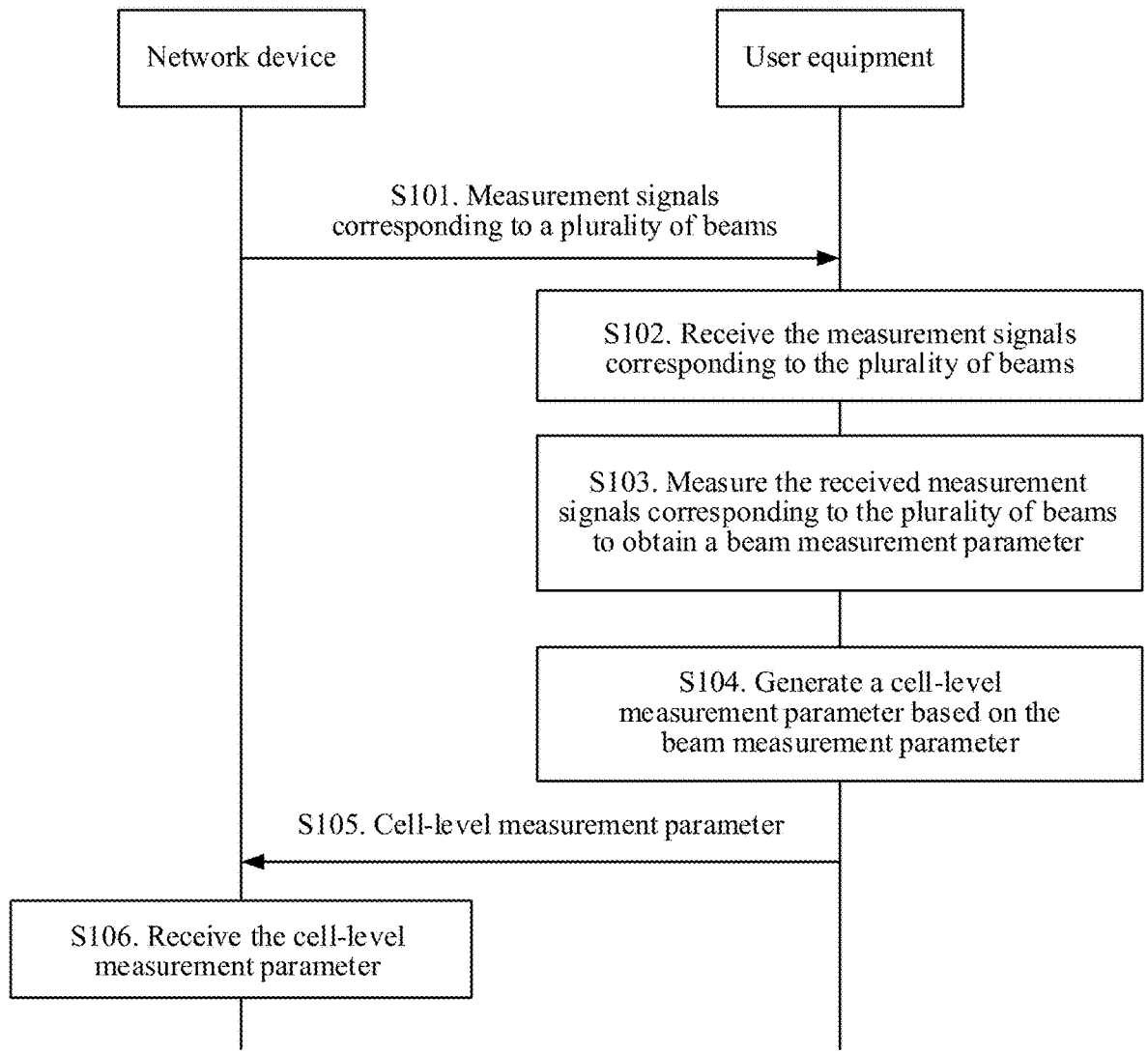
FIG. 3 is a schematic flowchart of a measurement parameter sending method according to an embodiment of the present invention.

FIG. 3 is a schematic flowchart of a measurement parameter sending method according to an embodiment of the present invention. The method is described from a perspective of interaction between a network device and user equipment, and the method includes but is not limited to the following steps.

Step S101: The network device sends measurement signals corresponding to a plurality of beams. Optionally, the network device sends the plurality of beams to the user equipment.

The plurality of beams include two beams or more than two beams. A specific quantity is set by the network device, and the beam may be a transmit beam of the network device other than a transmit beam of the user equipment. Each of the plurality of beams corresponds to a measurement signal, and the measurement signal may be used for measurement, and may be used for inter-cell or intra-cell mobility measurement.

Step S102: The user equipment receives the measurement signals corresponding to the plurality of beams. Optionally, the user equipment receives the measurement signals that correspond to the plurality of beams and that are sent by the network device.

Step S103: The user equipment measures the received measurement signals corresponding to the plurality of beams to obtain a beam measurement parameter.

Specifically, when receiving the measurement signals corresponding to the plurality of beams, the user equipment measures the measurement signals corresponding to the plurality of beams.

In a first possible implementation, an SS-block includes only synchronization signals, and does not include other reference signals. In this case, the measurement signals include the synchronization signals, and the user equipment measures the synchronization signals corresponding to the plurality of beams to obtain a plurality of synchronization signal (SS) measurement parameters corresponding to the plurality of beams. A quantity of the plurality of SS measurement parameters is the same as a quantity of the plurality of beams, in other words, one beam corresponds to one SS measurement parameter.

In a second possible implementation, the SS-block includes DM-RSs in addition to the synchronization signal. For example, FIG. 2 includes SSs and DM-RSs. In this case, the measurement signals include the synchronization signals and the DM-RSs, and the user equipment may obtain the plurality of SS measurement parameters corresponding to the plurality of beams by measuring the synchronization signals corresponding to the plurality of beams, and may obtain a plurality of DM-RS measurement parameters corresponding to the plurality of beams by measuring the DM-RSs corresponding to the plurality of beams. A quantity of the plurality of DM-RS measurement parameters is the same as the quantity of plurality of beams, and in this case, a beam measurement parameter corresponding to a beam may be a combination of an SS measurement parameter corresponding to the beam and a DM-RS measurement parameter corresponding to the beam. The combination may be averaging or superimposition, and a combination manner is not limited herein. A measurement result of the second possible implementation is more accurate than that of the first possible implementation.

If the SS-block includes other reference signals in addition to the synchronization signal and the DM-RS, the user equipment further measures other reference signals corresponding to the plurality of beams, and combines a measure value of the other reference signals with the SS measurement parameters and the DM-RS measurement parameter, to obtain a beam measurement parameter corresponding to each beam. In this case, a measurement result may be more accurate than those of the first and second possible implementations.

It should be noted that, there is a further possible implementation, in which the SS-block includes the synchronization signals and the DM-RSs, but the user equipment measures only the synchronization signals corresponding to the plurality of beams to obtain the plurality of SS measurement parameters corresponding to the plurality of beams, but does not measure the DM-RSs corresponding to the plurality of beams.

It should be noted that a beam measurement parameter corresponding to a beam may be an SS measurement parameter corresponding to the beam, may be a combination of the SS measurement parameter and a DM-RS measurement parameter corresponding to the beam, or may be a combination of the SS measurement parameter, the DM-RS measurement parameter, and other reference signal measurement parameters corresponding to the beam.

Measuring the measurement signal corresponding to the beam may be, but is not limited to, measuring a measurement signal in a synchronization signal block corresponding to the beam. Therefore, if measuring the measurement signal corresponding to the beam is measuring the measurement signal in the synchronization signal block corresponding to the beam, the beam measurement parameter obtained by the user equipment by measuring the measurement signals corresponding to the plurality of beams may also be defined as an SS-block-measurement parameter. The beam measurement parameter is described below by using an SS-block-measurement parameter as an example. The SS-block-measurement parameter includes at least one of parameters such as a reference signal received power (RSRP), a reference signal received quality (RSRQ), and a received signal strength indicator (RSSI). The SS-block-measurement parameter is described below by using an SS-block-RSRP as an example, and other parameters are described similarly. A unit of the SS-block-RSRP is decibel milliwatts (dBm).

A quantity of SS-block-RSRPs may be the same as the quantity of plurality of beams, in other words, one beam corresponds to one SS-block-RSRP; there may be one SS-block-RSRP, in other words, a plurality of SS-block-RSRPs corresponding to the plurality of beams are calculated to obtain one SS-block-RSRP; or there may be N (less than the quantity of plurality of beams) SS-block-RSRPs, in other words, N SS-block-RSRPs are selected from the plurality of SS-block-RSRPs corresponding to the plurality of beams. A specific quantity of SS-block-RSRPs is determined based on a specific case.

If there is one SS-block-RSRP, the user equipment may average a plurality of SS-block-RSRPs corresponding to the plurality of beams to obtain a first average measurement parameter, where a quantity of the plurality of SS-block-RSRPs is the same as the quantity of plurality of beams, and determines the first average measurement parameter as the SS-block-RSRP; the user equipment may sort the plurality of beams in time order, and average P SS-block-RSRPs corresponding to first sorted P (from the first to the $P^{th}$) beams (e.g., first P orthogonal frequency division multiplex (OFDM) symbols) to obtain a second average measurement parameter, and determines the second average measurement parameter as the SS-block-RSRP; or the user equipment may average Q SS-block-RSRPs that correspond to Q beams at a preset time location in a plurality of SS-block-RSRPs corresponding to the plurality of beams to obtain a third average measurement parameter, and determines the third average measurement parameter as the SS-block-RSRP, where a specific location of the preset time location is not limited herein.

Step S104: The user equipment generates a cell-level measurement parameter based on the beam measurement parameter.

Specifically, the user equipment generates a cell-level (e.g., cell-level, but not limited thereto) measurement parameter based on the beam measurement parameter. In an example of an RSRP, the user equipment generates a cell-level-RSRP based on the SS-block-RSRP. For a different quantity of SS-block-RSRPs, a quantity of cell-level-RSRPs may be different.

In a possible implementation, the quantity of SS-block-RSRPs is the same as the quantity of plurality of beams, and there is one cell-level-RSRP. In this case, the network device generates the cell-level-RSRP based on the plurality of SS-block-RSRPs corresponding to the plurality of beams. Optionally, the network device averages the plurality of SS-block-RSRPs corresponding to the plurality of beams to obtain a first average measurement parameter, and determines the first average measurement parameter as the cell-level-RSRP. Optionally, the network device sorts the plurality of SS-block-RSRPs corresponding to the plurality of beams in descending order, and averages first sorted N (from the first to the $N^{th}$) SS-block-RSRPs to obtain a second average measurement parameter, and determines the second average measurement parameter as the cell-level-RSRP. N is less than the quantity of plurality of beams, and a specific quantity is not limited herein. Optionally, the network device obtains SS-block-RSRPs exceeding a preset threshold, and averages these SS-block-RSRPs to obtain a third average measurement parameter, and determines the third average measurement parameter as the cell-level-RSRP. A specific quantity of preset thresholds is not limited herein. Optionally, the network device obtains an optimal SS-block-RSRP of the plurality of SS-block-RSRPs corresponding to the plurality of beams, and determines the optimal SS-block-RSRP as the cell-level-RSRP. The optimal SS-block-RSRP may be a largest SS-block-RSRP, or may be an SS-block-RSRP differing least from a last measured SS-block-RSRP for a same beam, that is, a most stable SS-block-RSRP.

In a possible implementation, the quantity of SS-block-RSRPs is the same as the quantity of plurality of beams, and the quantity of cell-level-RSRPs is the same as the quantity of plurality of beams, in other words, the cell-level-RSRP includes an SS-block-RSRP corresponding to each beam.

In a possible implementation, there are M cell-level-RSRPs, including M SS-block-RSRPs, and a value of M is less than the quantity of plurality of beams. A rule for selecting the M SS-block-RSRPs is not limited herein. For example, first M (from the first to the $M^{th}$) SS-block-RSRPs of a plurality of SS-block-RSRPs sorted in descending order corresponding to the plurality of beams may be selected, or M SS-block-RSRPs corresponding to M odd or even beams of the plurality of beams may be selected.

In a possible implementation, there is one cell-level-RSRP, that is, the cell-level-RSRP is the optimal SS-block-RSRP of the plurality of SS-block-RSRPs corresponding to plurality of beams. The optimal SS-block-RSRP may be the largest SS-block-RSRP, or may be the SS-block-RSRP differing least from the last measured SS-block-RSRP for the same beam, that is, the most stable SS-block-RSRP.

Step S105: The user equipment sends the cell-level measurement parameter. Optionally, the user equipment sends the cell-level measurement parameter to the network device.

Optionally, the user equipment may send the cell-level measurement parameter to the network device by using layer 3 (L3) signaling. The L3 signaling may be a measurement report.

Although the cell-level-RSRP may include the plurality of SS-block-RSRPs corresponding to the plurality of beams, and may also include M SS-block-RSRPs, the cell-level-RSRP is carried in one piece of L3 signaling to be sent, and therefore reporting overheads can be reduced.

Optionally, before sending the cell-level-RSRP, the user equipment may perform filtering processing on the cell-level-RSRP, for example, perform layer 3 filtering processing on the cell-level-RSRP. A formula of the layer 3 filtering may be $Fn=(1-a)*Fm+a*Mn$ where Mn is a current measurement value, Fm is a previous filtered value, Fn is a current filtered value, and a is a filtering coefficient.

Step S106: The network device receives the cell-level measurement parameter. Optionally, the network device receives the cell-level measurement parameter sent by the user equipment;

Optionally, the cell-level measurement parameter may be used for inter-cell handover or reselection. When receiving the cell-level-RSRP reported by the user equipment, the network device may determine, based on the cell-level-RSRP, whether the user equipment needs to perform cell handover or reselection. If the user equipment is in a connected state, the network device determines whether the user equipment needs to perform cell handover; or if the user equipment is in an idle state, the network device determines whether the user equipment needs to perform cell reselection. A method for the network device to determine, based on the cell-level-RSRP, whether the user equipment needs to perform cell handover or reselection is not limited herein.

In the method described in FIG. 3, through measurement of the measurement signal corresponding to each of the plurality of beams, measurement reporting of the plurality of beams in the NR system is implemented, and reporting does not need to be performed for each beam, so that reporting overheads can be reduced.

Steps S103 to S105 in the embodiment shown in FIG. 3 are described in three manners. Optionally, description is made by using an example in which the measurement signals include the synchronization signals.

Manner 1:

Step S103a: The user equipment measures the measurement signals corresponding to the plurality of beams to obtain a plurality of beam measurement parameters corresponding to the plurality of beams.

Specifically, the user equipment measures the synchronization signals, the synchronization signals and the DM-RSs, or the synchronization signals, the DM-RSs, and other reference signals corresponding to the plurality of beams to obtain the plurality of SS-block-RSRPs corresponding to the plurality of beams.

Optionally, when receiving configuration information of a channel state information reference signal (CSI-RS), the user equipment measures all ports of the CSI-RS based on the configuration information to obtain a CSI-RS cell-level measurement parameter. It may be understood that different CSI-RS ports are configured to differentiate between different beams, and one CSI-RS port corresponds to one beam.

The CSI-RS cell-level measurement parameter is an average measurement parameter obtained by averaging all measurement parameters corresponding to all the ports; is an average measurement parameter obtained by averaging first L measurement parameters of all measurement parameters that correspond to all the ports and that are sorted in descending order; or is a largest measurement parameter of all measurement parameters corresponding to all the ports. The configuration information of the CSI-RS includes a port quantity and a port number. The port quantity indicates a quantity of ports that are occupied, for example, 1, 2, or 4, and the port number indicates a port that is occupied, for example, a port 1 or a port 2. The CSI-RS cell-level measurement parameter may be, for example, a CSI-RS-cell-level-RSRP.

Step S104a: The user equipment generates one cell-level measurement parameter based on the plurality of beam measurement parameters corresponding to the plurality of beams.

In a possible implementation, the user equipment averages the plurality of SS-block-RSRPs corresponding to the plurality of beams to obtain a first average measurement parameter, and determines the first average measurement parameter as the SS-cell-level-RSRP.

In a possible implementation, the user equipment sorts the plurality of SS-block-RSRPs corresponding to the plurality of beams in descending order, and averages first sorted N (from the first to the $N^{th}$) SS-block-RSRPs to obtain a second average measurement parameter, and determines the second average measurement parameter as the SS-cell-level-RSRP. N is less than the quantity of plurality of beams, and a specific quantity is not limited herein.

In a possible implementation, the user equipment obtains SS-block-RSRPs exceeding a preset threshold, and averages these SS-block-RSRPs to obtain a third average measurement parameter, and determines the third average measurement parameter as the SS-cell-level-RSRP. A specific quantity of preset thresholds is not limited herein.

In a possible implementation, the user equipment obtains an optimal SS-block-RSRP of the plurality of SS-block-RSRPs corresponding to the plurality of beams, and determines the optimal SS-block-RSRP as the SS-cell-level-RSRP. The optimal SS-block-RSRP may be the largest SS-block-RSRP, or may be the SS-block-RSRP differing least from the last measured SS-block-RSRP for the same beam, that is, the most stable SS-block-RSRP.

In the foregoing possible implementations, the SS-cell-level-RSRP is a cell-level measurement parameter, and is a specific value.

Optionally, the user equipment averages the CSI-RS-cell-level-RSRP and the SS-cell-level-RSRP to obtain an average measurement parameter cell-level-RSRP, and uses the cell-level-RSRP as one cell-level measurement parameter. The SS-cell-level-RSRP may be any SS-cell-level-RSRP in the foregoing possible implementations.

Step S105a: The user equipment reports the one cell-level measurement parameter to the network device.

Specifically, the one cell-level measurement parameter may be any SS-cell-level-RSRP in the foregoing possible implementations, or may be obtained by averaging any SS-cell-level-RSRP in the foregoing possible implementations and the CSI-RS-cell-level-RSRP.

In Manner 1, through measurement of the measurement signals corresponding to the plurality of beams, measurement of the plurality of beams is implemented in the NR system, and one cell-level measurement parameter is reported, so that reporting overheads can be greatly reduced.

Manner 2:

Step S103b: The user equipment measures the measurement signals corresponding to the plurality of beams to obtain one beam measurement parameter.

Specifically, the user equipment measures the synchronization signals, the synchronization signals and the DM-RSs, or the synchronization signals, the DM-RSs, and other reference signals corresponding to the plurality of beams to obtain a plurality of SS-block-RSRPs corresponding to the plurality of beams.

In a possible implementation, the user equipment averages the plurality of SS-block-RSRPs corresponding to the plurality of beams to obtain a first average measurement parameter, and determines the first average measurement parameter as the one beam measurement parameter.

In a possible implementation, the user equipment sorts the plurality of beams in time order, averages P SS-block-RSRPs corresponding to first sorted P beams to obtain a second average measurement parameter, and determines the second average measurement parameter as the one beam measurement parameter.

In a possible implementation, the user equipment averages SS-block-RSRPs that correspond to Q beams at a preset time location in the plurality of SS-block-RSRPs corresponding to the plurality of beams to obtain a third average measurement parameter, and determines the third average measurement parameter as the one beam measurement parameter, where a specific location of the preset time location is not limited herein.

Optionally, when receiving configuration information of a CSI-RS, the user equipment measures all ports of the CSI-RS based on the configuration information to obtain a CSI-RS cell-level measurement parameter. It may be understood that different CSI-RS ports are configured to differentiate between different beams, and one CSI-RS port corresponds to one beam.

The CSI-RS cell-level measurement parameter is an average measurement parameter obtained by averaging all measurement parameters corresponding to all the ports; is an average measurement parameter obtained by averaging first L measurement parameters of all measurement parameters that correspond to all the ports and that are sorted in descending order; or is a largest measurement parameter of all measurement parameters corresponding to all the ports. The configuration information of the CSI-RS includes a port quantity and a port number. The port quantity indicates a quantity of ports that are occupied, for example, 1, 2, or 4, and the port number indicates a port that is occupied, for example, a port 1 or a port 2. The CSI-RS cell-level measurement parameter may be, for example, a CSI-RS-cell-level-RSRP.

Step S104b: The user equipment determines the one beam measurement parameter as the cell-level measurement parameter.

Optionally, the user equipment averages the CSI-RS-cell-level-RSRP and the one beam measurement parameter to obtain an average measurement parameter, and uses the average measurement parameter as the cell-level measurement parameter. The one beam measurement parameter may be any beam measurement parameter in the foregoing possible implementations.

Step S105b: The user equipment reports the cell-level measurement parameter to the network device.

Specifically, the cell-level measurement parameter may be any beam measurement parameter in the foregoing possible implementations, or may be obtained by averaging any beam measurement parameter in the foregoing possible implementations and the CSI-RS-cell-level-RSRP.

In Manner 2, through measurement of the measurement signals corresponding to the plurality of beams, measurement of the plurality of beams is implemented in the NR system, and one cell-level measurement parameter is reported, so that reporting overheads can be greatly reduced.

Manner 3:

Step S103c: The user equipment measures the measurement signals corresponding to the plurality of beams to obtain a plurality of beam measurement parameters corresponding to the plurality of beams.

For an implementation process of step S103c in Manner 3, refer to specific descriptions of step S103a in Manner 1, and details are not described herein again.

Step S104c: The user equipment determines a cell-level measurement parameter based on the plurality of beam measurement parameters corresponding to the plurality of beams.

In a possible implementation, the cell-level-RSRP includes a plurality of SS-block-RSRPs corresponding to the plurality of beams.

In a possible implementation, the cell-level-RSRP includes MSS-block-RSRPs, and a value of M is less than the quantity of plurality of beams. A rule for selecting the M SS-block-RSRPs is not limited herein. For example, first M (from the first to the $M^{th}$) SS-block-RSRPs of a plurality of SS-block-RSRPs sorted in descending order corresponding to the plurality of beams may be selected, or MSS-block-RSRPs corresponding to M odd or even beams of the plurality of beams may be selected.

In a possible implementation, the cell-level-RSRP includes one optimal SS-block-RSRP. The optimal SS-block-RSRP may be the largest SS-block-RSRP, or may be the SS-block-RSRP differing least from the last measured SS-block-RSRP for the same beam, that is, the most stable SS-block-RSRP.

Optionally, the user equipment averages the CSI-RS-cell-level-RSRP and the cell-level-RSRP to obtain one average measurement parameter, and uses the average measurement parameter as one cell-level measurement parameter. The cell-level-RSRP may be any cell-level-RSRP in the foregoing possible implementations.

Step S105c: The user equipment reports the cell-level measurement parameter to the network device.

Specifically, the cell-level measurement parameter may be any cell-level-RSRP in the foregoing possible implementations, or may be obtained by averaging any cell-level-RSRP in the foregoing possible implementations and the CSI-RS-cell-level-RSRP.

In Manner 3, through measurement of the measurement signal corresponding to each of the plurality of beams, measurement of the plurality of beams is implemented in the NR system, and the cell-level measurement parameter is reported once, so that reporting overheads can be reduced.

It should be noted that, in the foregoing three manners, the CSI-RS-cell-level-RSRP measured by the user equipment when receiving the configuration information of the CSI-RS may be directly reported to the network device as the cell-level measurement parameter. In other words, the beam measurement parameter measured based on the measurement signals may not be considered.

It should be noted that the measurement parameter in the foregoing embodiments is described by using an RSRP as an example. In actual application, the SS-block-measurement parameter includes at least one of an SS-block-RSRP, an SS-block-RSRQ, or an SS-block-RSSI, and the cell-level-measurement parameter includes at least one of a cell-level-RSRP, a cell-level-RSRQ, or a cell-level-RSSI. M, N, P, Q, and L in the foregoing embodiments may be positive integers, and specific values of M, N, P, Q, and L are not limited, and may be identical, may be completely different, or may be partly different.

Figure 4:
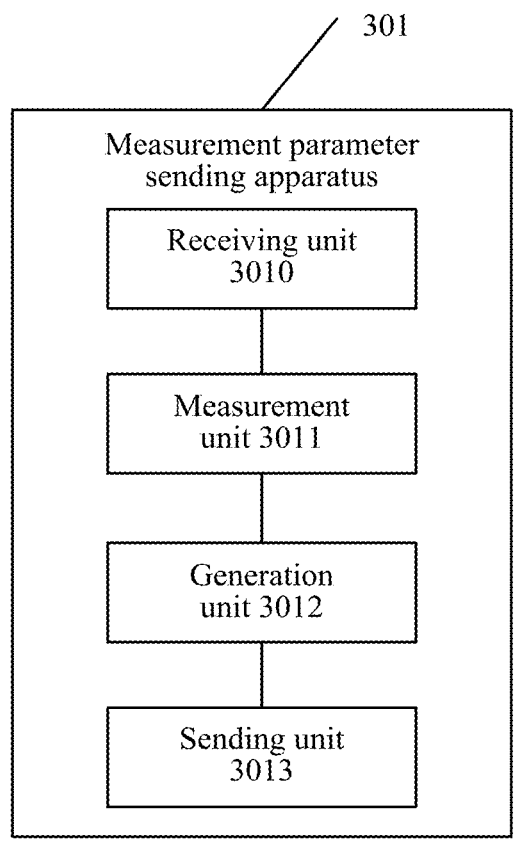
FIG. 4 is a schematic structural diagram of a measurement parameter sending apparatus according to an embodiment of the present invention.

It should be noted that a measurement parameter sending apparatus 301 shown in FIG. 4 can implement the user equipment side in the embodiment shown in FIG. 2. A receiving unit 3010 is configured to perform step S102, a measurement unit 3011 is configured to perform step S103, a generation unit 3012 is configured to perform step S104, and a sending unit 3013 is configured to perform step S105. The measurement parameter sending apparatus 301 is, for example, UE, or the measurement parameter sending apparatus 301 may be an application-specific integrated circuit (ASIC), a digital signal processor (DSP), or a chip that implements a related function.

Figure 5:
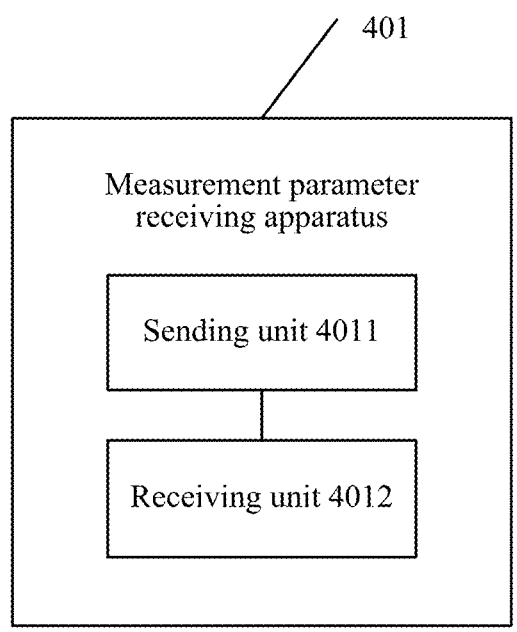
FIG. 5 is a schematic structural diagram of a measurement parameter receiving apparatus according to an embodiment of the present invention.

It should be noted that a measurement parameter receiving apparatus 401 shown in FIG. 5 can implement the network device side in the embodiment shown in FIG. 2. A sending unit 4011 is configured to perform step S101, and a receiving unit 4012 is configured to perform step S106. The measurement parameter receiving apparatus 401 is, for example, a base station, or the measurement parameter receiving apparatus 401 may be an ASIC, a DSP, or a chip that implements a related function.

Figure 6:
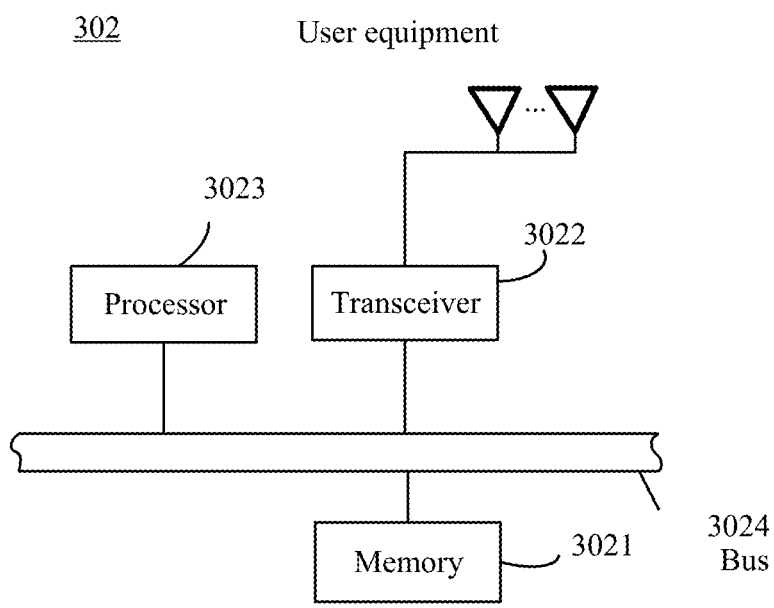
FIG. 6 is a schematic structural diagram of user equipment according to an embodiment of the present invention.

As shown in FIG. 6, an embodiment of the present invention further provides user equipment 302. The user equipment may be a DSP, an ASIC, or a chip that implements a related resource mapping function. The user equipment 302 includes: a memory 3021, a transceiver 3022, a processor 3023, and a bus 3024.

The memory 3021 is configured to store a program. The memory may be a random access memory (RAM), a read only memory (ROM), or a flash memory, and the memory may be located within a communications device alone, or may be located inside the processor 3023.

The transceiver 3022 may be used as an independent chip, may be used as a transceiver circuit in the processor 3023, or may be used as an input/output interface. The transceiver 3022 is configured to receive measurement signals corresponding to a plurality of beams, and the transceiver 3022 is further configured to send a cell-level measurement parameter.

The processor 3023 is configured to execute the program stored in the memory. When the program is executed, the processor 3023 is configured to measure the measurement signals that correspond to the plurality of beams and that are received by the transceiver 3022 to obtain a beam measurement parameter. The processor 3023 is further configured to generate the cell-level measurement parameter based on the beam measurement parameter.

The transceiver 3021, the memory 3022, and the processor 3023 are optionally connected by using the bus 3024.

Figure 7:
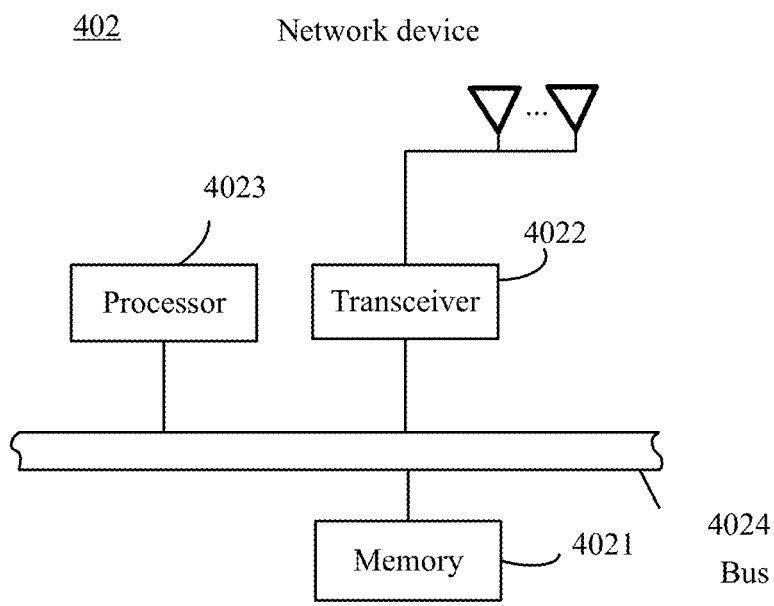
FIG. 7 is a schematic structural diagram of a network device according to an embodiment of the present invention.

As shown in FIG. 7, an embodiment of the present invention further provides a network device 402. The network device may be a base station, a DSP, an ASIC, or a chip that implements a related resource mapping function. The network device 402 includes: a memory 4021, a transceiver 4022, a processor 4023, and a bus 4024.

The memory 4021 is configured to store a program. The memory may be a RAM, a ROM, or a flash memory, and the memory may be located within a communications device alone, or may be located inside the processor 4042.

The transceiver 4022 may be used as an independent chip, may be used as a transceiver circuit in the processor 4023, or may be used as an input/output interface. The transceiver 4022 is configured to send measurement signals corresponding to a plurality of beams, and the transceiver 4022 is further configured to receive a cell-level measurement parameter. The cell-level measurement parameter is generated based on a beam measurement parameter, and the beam measurement parameter is obtained by measuring the measurement signals corresponding to the plurality of beams.

The processor 4023 is configured to execute the program stored in the memory.

The transceiver 4021, the memory 4022, and the processor 4023 are optionally connected by using the bus 4024.

An embodiment of the present invention further provides a communications system, including the network device in the foregoing network device embodiment and the user equipment in the user equipment embodiment.

This solution is based on the application document with the Patent Application No. 201710198778.1, filed on Mar. 29, 2017 and entitled "MEASUREMENT PARAMETER SENDING METHOD AND APPARATUS". To describe the solution more clearly, the following descriptions are added, and the added descriptions are applicable to the foregoing embodiments:

The foregoing method embodiment further includes: sending, by the network device, measurement reporting type indication information. Optionally, the measurement reporting type indication information is sent by using RRC signaling or a broadcast message. Optionally, the measurement reporting type indication information is sent to the user equipment. The measurement reporting type indication information is used to instruct to report the SS-cell-level-RSRP, instruct to report the CSI-RS-cell-level-RSRP, instruct to report an average measurement parameter obtained by averaging the SS-cell-level-RSRP and the CSI-RS-cell-level-RSRP, or instruct to report two measurement parameters: the CSI-RS-cell-level-RSRP and the SS-cell-level-RSRP.

The measurement reporting type indication information included in the RRC signaling or the broadcast message may be shown in the following example: an information element sent by the network device may include: {cell-level-measurement-type ENUMERATED {SS-block-cell-level-RSRP, CSI-RS-cell-level-RSRP, combined-cell-level-RSRP, two-cell-level-RSRP}, used to indicate, to the UE, a manner in which the cell-level-RSRP is generated}.

The SS-block-cell-level-RSRP indicates that the cell level RSRP is generated in an SS-block manner, and corresponding measurement reporting type indication information is used to instruct to report the SS-cell-level-RSRP.

The CSI-RS-cell-level-RSRP indicates that the cell level RSRP is generated in a CSI-RS manner, and corresponding measurement reporting type indication information is used to instruct to report the CSI-RS-cell-level-RSRP.

The combined-cell-level-RSRP indicates that the cell level RSRP is generated in a combined averaging manner, and corresponding measurement reporting type indication information is used to instruct to report one average measurement parameter obtained by averaging the SS-cell-level-RSRP and the CSI-RS-cell-level-RSRP.

The two-cell-level-RSRP indicates that the cell level RSRP is generated in an SS-block+CSI-RS manner, and corresponding measurement reporting type indication information is used to instruct to report two measurement parameters: the CSI-RS-cell-level-RSRP and the SS-cell-level-RSRP.

When receiving the measurement reporting type indication information, the user equipment sends the cell-level measurement parameter to the network device based on the measurement reporting type indication information.

In the foregoing method embodiments, the CSI-RS-cell-level-RSRP is an average measurement parameter obtained by averaging all measurement parameters corresponding to all the ports; is an average measurement parameter obtained by averaging first L measurement parameters of all measurement parameters that correspond to all the ports and that are sorted in descending order; or is a largest measurement parameter of all measurement parameters corresponding to all the ports, in other words, the CSI-RS-cell-level-RSRP includes one measurement parameter.

In this solution, a case in which the CSI-RS-cell-level-RSRP includes K measurement parameters of all measurement parameters corresponding to all ports is added. The K measurement parameters may be first K measurement parameters of all measurement parameters sorted in descending order corresponding to all the ports. K is a positive integer greater than zero, and K is less than or equal to a quantity of all the ports.

The network device sends the measurement reporting type indication information to the user equipment by using the RRC signaling or the broadcast message. The measurement reporting type indication information is used to instruct to report the SS-cell-level-RSRP; instruct to report the CSI-RS-cell-level-RSRP (including one measurement parameter); instruct to report one average measurement parameter obtained by averaging the SS-cell-level-RSRP and the CSI-RS-cell-level-RSRP (including one measurement parameter); instruct to report the CSI-RS-cell-level-RSRP (including one measurement parameter) and the SS-cell-level-RSRP; instruct to report the CSI-RS-cell-level-RSRP (including K measurement parameters) and the SS-cell-level-RSRP; instruct to report the CSI-RS-cell-level-RSRP (including K measurement parameters); or instruct to report one average measurement parameter obtained by averaging the SS-cell-level-RSRP and the CSI-RS-cell-level-RSRP (including K measurement parameters).

To enrich the solution of the embodiments of the present invention, based on the priority application document, the following descriptions are added to the foregoing apparatus embodiment this time.

The transceiver 3022 sends the cell-level measurement parameter based on the received measurement reporting type indication information. The measurement reporting type indication information is used to instruct to report the beam measurement parameter or report the cell-level measurement parameter obtained by averaging the beam measurement parameter and the CSI-RS cell-level measurement parameter, namely, instruct to report the SS-cell-level-RSRP or report the average value of the CSI-RS-cell-level-RSRP and the SS-cell-level-RSRP.

In a possible implementation, the transceiver 3022 is configured to receive configuration information of a CSI-RS.

The processor 3023 is configured to measure all ports of the CSI-RS based on the configuration information to obtain a plurality of CSI-RS measurement parameters.

The processor 3023 is further configured to generate the CSI-RS cell-level measurement parameter based on the plurality of CSI-RS measurement parameters.

The transceiver 3022 is further configured to send the CSI-RS cell-level measurement parameter. The transceiver 3022 may send the CSI-RS cell-level measurement parameter based on received measurement reporting type indication information.

The measurement reporting type indication information is used to instruct to report one CSI-RS measurement parameter or report K CSI-RS measurement parameters, where K is a positive integer.

In a possible implementation, the transceiver 3022 is configured to receive measurement signals corresponding to a plurality of beams and configuration information of a CSI-RS.

The processor 3023 is configured to measure the received measurement signals corresponding to the plurality of beams to obtain a synchronization signal SS cell-level measurement parameter.

The processor 3023 is further configured to measure all ports of the CSI-RS based on the configuration information to obtain a CSI-RS cell-level measurement parameter.

The transceiver 3022 is further configured to send at least one of the SS cell-level measurement parameter and the CSI-RS cell-level measurement parameter, and may be specifically configured to send at least one of the SS cell-level measurement parameter and the CSI-RS cell-level measurement parameter based on received measurement reporting type indication information.

The measurement reporting type indication information is used to instruct to report the SS cell-level measurement parameter, report the CSI-RS cell-level measurement parameter, report an average value of the SS cell-level measurement parameter and the CSI-RS cell-level measurement parameter, or report two measurement parameters: the SS cell-level measurement parameter and the CSI-RS cell-level measurement parameter.

The apparatus in the implementation of this application may be a field programmable gate array (FPGA), may be an application-specific integrated circuit (ASIC), may be a system on chip (SoC), may be a central processing unit (CPU), may be a network processor (NP), may be a digital signal processor (DSP), may be a microcontroller (MCU), or may be a programmable logic device (PLD) or another integrated chip.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again. For ease of brevity, each method embodiment may also be used as mutual reference, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A measurement parameter sending method, comprising:
   receiving measurement signals corresponding to a plurality of beams;
   measuring the measurement signals to obtain a beam measurement parameter;
   generating a cell-level measurement parameter based on the beam measurement parameter;
   sending the cell-level measurement parameter;
   receiving configuration information of a channel state information reference signal (CSI-RS); and
   measuring, in response to receiving the configuration information of the CSI-RS, all ports of the CSI-RS based on the configuration information to obtain a CSI-RS cell-level measurement parameter,
   wherein the CSI-RS cell-level measurement parameter is one of the group consisting of:
      an average measurement parameter obtained by averaging all CSI-RS measurement parameters corresponding to all the ports;
      an average measurement parameter obtained by averaging first L CSI-RS measurement parameters of all CSI-RS measurement parameters that correspond to all the ports and that are sorted in descending order, wherein L is a positive integer; and
      a largest CSI-RS measurement parameter of all CSI-RS measurement parameters corresponding to all the ports,
   wherein the generating a cell-level measurement parameter based on the beam measurement parameter comprises averaging the beam measurement parameter and the CSI-RS cell-level measurement parameter to obtain the cell-level measurement parameter,
   wherein the sending the cell-level measurement parameter comprises sending the cell-level measurement parameter based on received measurement reporting type indication information, and
   wherein the measurement reporting type indication information is used to instruct to report:
      the beam measurement parameter, or
      the cell-level measurement parameter.

2. The method according to claim 1, wherein the measurement signals comprise synchronization signals; and
   wherein the measuring the measurement signals comprises:
   measuring the synchronization signals to obtain the beam measurement parameter.

3. The method according to claim 1, wherein the measurement signals comprise synchronization signals and demodulation reference signals; and
   wherein the measuring the measurement signals comprises:
   measuring the synchronization signals and demodulation reference signals to obtain the beam measurement parameter.

4. The method according to claim 1, wherein the beam measurement parameter comprises a plurality of beam measurement parameters, wherein each one of the plurality of beam measurement parameters corresponds to one of the plurality of beams.

5. The method according to claim 4, further comprising:
averaging the plurality of beam measurement parameters to obtain an average measurement parameter.

6. The method according to claim 5, wherein the averaging comprises:
averaging first N beam measurement parameters of the plurality of beam measurement parameters that correspond to the plurality of beams and that are sorted in descending order, to obtain the average measurement parameter wherein N is a positive integer less than the quantity of the plurality of beams; or
averaging beam measurement parameters that exceed a preset threshold in the plurality of beam measurement parameters corresponding to the plurality of beams to obtain the average measurement parameter.

7. The method according to claim 4, wherein the measuring the measurement signals to obtain a beam measurement parameter comprises:
measuring the measurement signals to obtain the plurality of beam measurement parameters corresponding to the plurality of beams.

8. The method of claim 4, further comprising:
obtaining a largest beam measurement parameter of the plurality of beam measurement parameters corresponding to the plurality of beams.

9. The method according to claim 7 further comprising:
averaging the plurality of beam measurement parameters to obtain an average measurement parameter,
wherein the averaging comprises performing at least one of the group consisting of:
averaging P beam measurement parameters corresponding to first P beams of the plurality of beams sorted in time order, to obtain a second average measurement parameter, and determining the second average measurement parameter as the beam measurement parameter, wherein P is a positive integer; and
averaging Q beam measurement parameters corresponding to Q beams that are of the plurality of beams and that are at a preset time location to obtain a third average measurement parameter, and determining the third average measurement parameter as the beam measurement parameter, wherein Q is a positive integer.

10. A user equipment, comprising a processor and a transceiver, wherein the transceiver and processor are configured to cooperatively operate to facilitate carrying out a method comprising:
receiving measurement signals corresponding to a plurality of beams;
measuring the measurement signals to obtain a beam measurement parameter;
generating a cell-level measurement parameter based on the beam measurement parameter;
sending the cell-level measurement parameter;
receiving configuration information of a channel state information reference signal (CSI-RS); and
measuring, in response to receiving the configuration information of the CSI-RS, all ports of the CSI-RS based on the configuration information to obtain a CSI-RS cell-level measurement Parameter,
wherein the CSI-RS cell-level measurement parameter is one of the group consisting of:
an average measurement parameter obtained by averaging all CSI-RS measurement parameters corresponding to all the ports;
an average measurement parameter obtained by averaging first L CSI-RS measurement parameters of all CSI-RS measurement parameters that correspond to all the ports and that are sorted in descending order, wherein L is a positive integer; and
a largest CSI-RS measurement parameter of all CSI-RS measurement parameters corresponding to all the ports,
wherein the generating a cell-level measurement parameter based on the beam measurement parameter comprises averaging the beam measurement parameter and the CSI-RS cell-level measurement parameter to obtain the cell-level measurement parameter,
wherein the sending the cell-level measurement parameter comprises sending the cell-level measurement parameter based on received measurement reporting type indication information, and
wherein the measurement reporting type indication information is used to instruct to report:
the beam measurement parameter, or
the cell-level measurement parameter.

11. The user equipment according to claim 10, wherein:
the measurement signals comprise synchronization signals; and
wherein the measuring the measurement signals comprises measuring the synchronization signals to obtain the beam measurement parameter.

12. The user equipment according to claim 10, wherein the measurement signals comprise synchronization signals and demodulation reference signals; and
wherein the measuring the measurement signals comprises:
measuring the synchronization signals and demodulation reference signals to obtain the beam measurement parameter.

13. The user equipment according to claim 10, wherein the beam measurement parameter comprises a plurality of beam measurement parameters, wherein each one of the plurality of beam measurement parameters corresponds to one of the plurality of beams.

14. The user equipment according to claim 13, further comprising:
averaging the plurality of beam measurement parameters to obtain an average measurement parameter.

15. The user equipment according to claim 13, wherein when the measuring the measurement signals to obtain the beam measurement parameter comprises:
measuring the measurement signals to obtain the plurality of beam measurement parameters corresponding to the plurality of beams.

16. The user equipment according to claim 14, wherein the averaging comprises:
averaging first N beam measurement parameters of the plurality of beam measurement parameters that correspond to the plurality of beams and that are sorted in descending order, to obtain the average measurement parameter, wherein N is a positive integer less than the quantity of the plurality of beams; or
averaging beam measurement parameters that exceed a preset threshold in the plurality of beam measurement parameters corresponding to the plurality of beams to obtain the average measurement parameter.

17. The user equipment of claim 13, further comprising:
obtaining a largest beam measurement parameter of the plurality of beam measurement parameters corresponding to the plurality of beams.

18. The user equipment according to claim 15 wherein the method further comprises:
avenging the plurality of beam measurement parameters to obtain an average measurement parameter,
wherein the averaging comprises performing at least one of the group consisting of:
averaging P beam measurement parameters corresponding to first P beams of the plurality of beams sorted in time order, to obtain a second average measurement parameter, and determining the second average measurement parameter as the beam measurement parameter, wherein P is a positive integer; and
averaging Q beam measurement parameters corresponding to Q beams that are of the plurality of beams and that are at a preset time location to obtain a third average measurement parameter, and determining the third average measurement parameter as the beam measurement parameter, wherein Q is a positive integer.

19. A measurement parameter receiving method, comprising:
sending measurement signals corresponding to a plurality of beams; and
receiving, from a user equipment in accordance with the sending, a cell-level measurement parameter,
wherein the cell-level measurement parameter is generated by the user equipment based on a beam measurement parameter, and the beam measurement parameter is obtained by the user equipment measuring the measurement signals corresponding to the plurality of beams according to the following:
receiving configuration information of a channel state information reference signal (CSI-RS);
measuring, in response to receiving the configuration information of the CSI-RS, all ports of the CSI-RS based on the configuration information to obtain a CSI-RS cell-level measurement parameter,
wherein the CSI-RS cell-level measurement parameter is one of the group consisting of:
an average measurement parameter obtained by averaging all CSI-RS measurement parameters corresponding to all the ports;
an average measurement parameter obtained by averaging first L CSI-RS measurement parameters of all CSI-RS measurement parameters that correspond to all the ports and that are sorted in descending order, wherein L is a positive integer; and
a largest CSI-RS measurement parameter of all CSI-RS measurement parameters corresponding to all the ports,
wherein the generating a cell-level measurement parameter based on the beam measurement parameter comprises averaging the beam measurement parameter and the CSI-RS cell-level measurement parameter to obtain the cell-level measurement parameter,
wherein the sending the cell-level measurement parameter comprises sending the cell-level measurement parameter based on received measurement reporting type indication information, and
wherein the measurement reporting type indication information is used to instruct to report:
the beam measurement parameter, or
the cell-level measurement parameter.

20. A network device, comprising a transceiver and a processor, wherein the transceiver and the processor are configured to cooperatively operate to carry out a method comprising:
sending measurement signals corresponding to a plurality of beams; and
receiving, from a user equipment in accordance with the sending, a cell-level measurement parameter,
wherein the cell-level measurement parameter is generated by the user equipment based on a beam measurement parameter, and the beam measurement parameter is obtained by the user equipment measuring the measurement signals corresponding to the plurality of beams according to the following:
receiving configuration information of a channel state information reference signal (CSI-RS);
measuring, in response to receiving the configuration information of the CSI-RS, all ports of the CSI-RS based on the configuration information to obtain a CSI-RS cell-level measurement parameter,
wherein the CSI-RS cell-level measurement parameter is one of the group consisting of:
an average measurement parameter obtained by averaging all CSI-RS measurement parameters corresponding to all the ports;
an average measurement parameter obtained by averaging first L CSI-RS measurement parameters of all CSI-RS measurement parameters that correspond to all the ports and that are sorted in descending order, wherein L is a positive integer; and
a largest CSI-RS measurement parameter of all CSI-RS measurement parameters corresponding to all the ports,
wherein the generating a cell-level measurement parameter based on the beam measurement parameter comprises averaging the beam measurement parameter and the CSI-RS cell-level measurement parameter to obtain the cell-level measurement parameter,
wherein the sending the cell-level measurement parameter comprises sending the cell-level measurement parameter based on received measurement reporting type indication information, and
wherein the measurement reporting type indication information is used to instruct to report:
the beam measurement parameter, or
the cell-level measurement parameter.

* * * * *

UNITED STATES PATENT AND TRADEMARK OFFICE
CERTIFICATE OF CORRECTION

| | |
|---|---|
| PATENT NO. | : 11,089,498 B2 |
| APPLICATION NO. | : 16/586783 |
| DATED | : August 10, 2021 |
| INVENTOR(S) | : Luo et al. |

It is certified that error appears in the above-identified patent and that said Letters Patent is hereby corrected as shown below:

In the Claims

Claim 10: Column 21, Line 62: "CSI-RS cell-level measurement Parameter," should read
-- CSI-RS cell-level measurement parameter, --.

Signed and Sealed this
Twelfth Day of July, 2022

Katherine Kelly Vidal
*Director of the United States Patent and Trademark Office*